Oct. 17, 1939.    A. S. RIGGS    2,176,102
LAG COMPENSATOR FOR ELECTRICAL CONTROL SYSTEMS
Filed Oct. 20, 1936    2 Sheets-Sheet 1
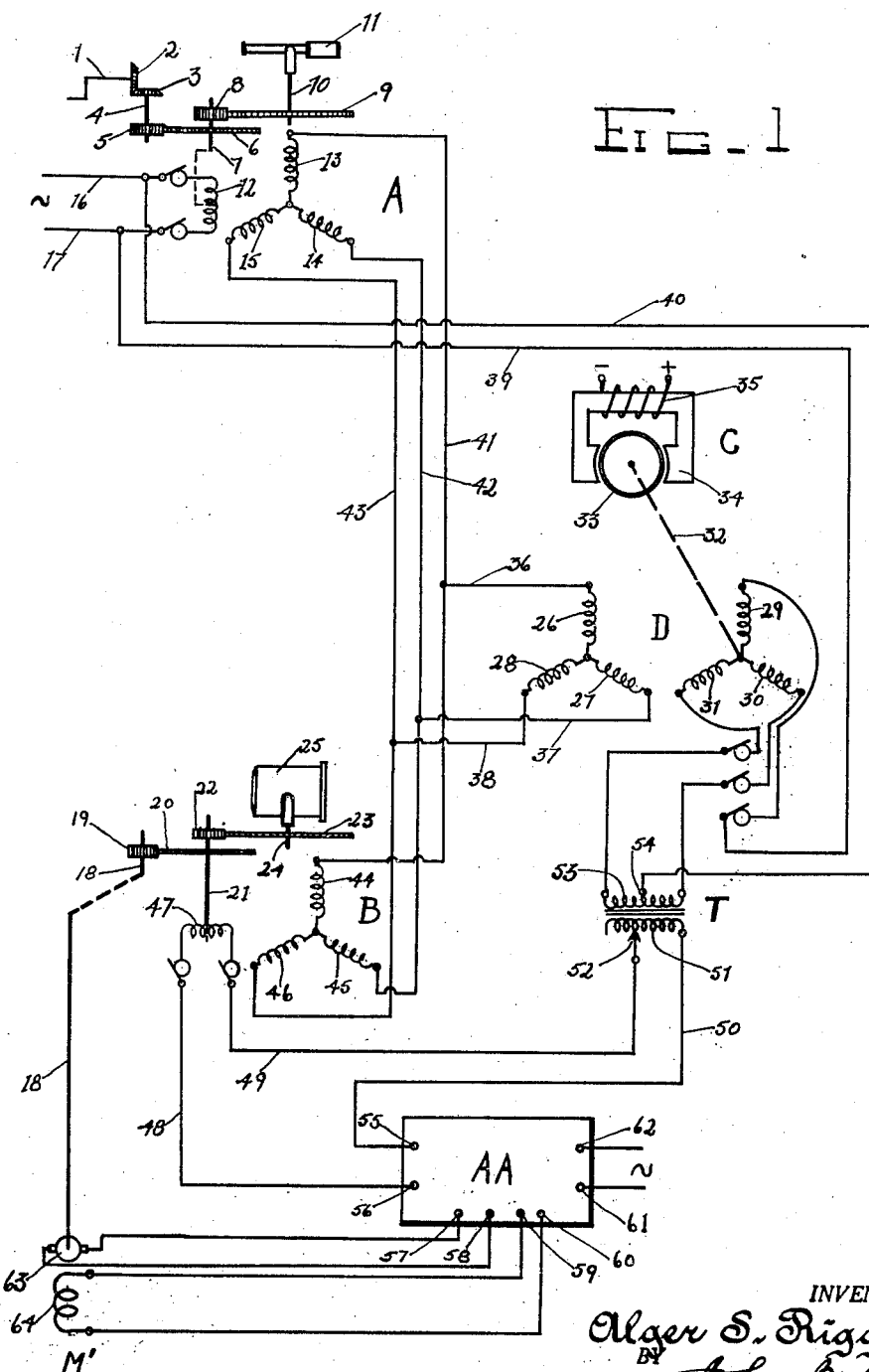

Oct. 17, 1939.    A. S. RIGGS    2,176,102
LAG COMPENSATOR FOR ELECTRICAL CONTROL SYSTEMS
Filed Oct. 20, 1936    2 Sheets-Sheet 2
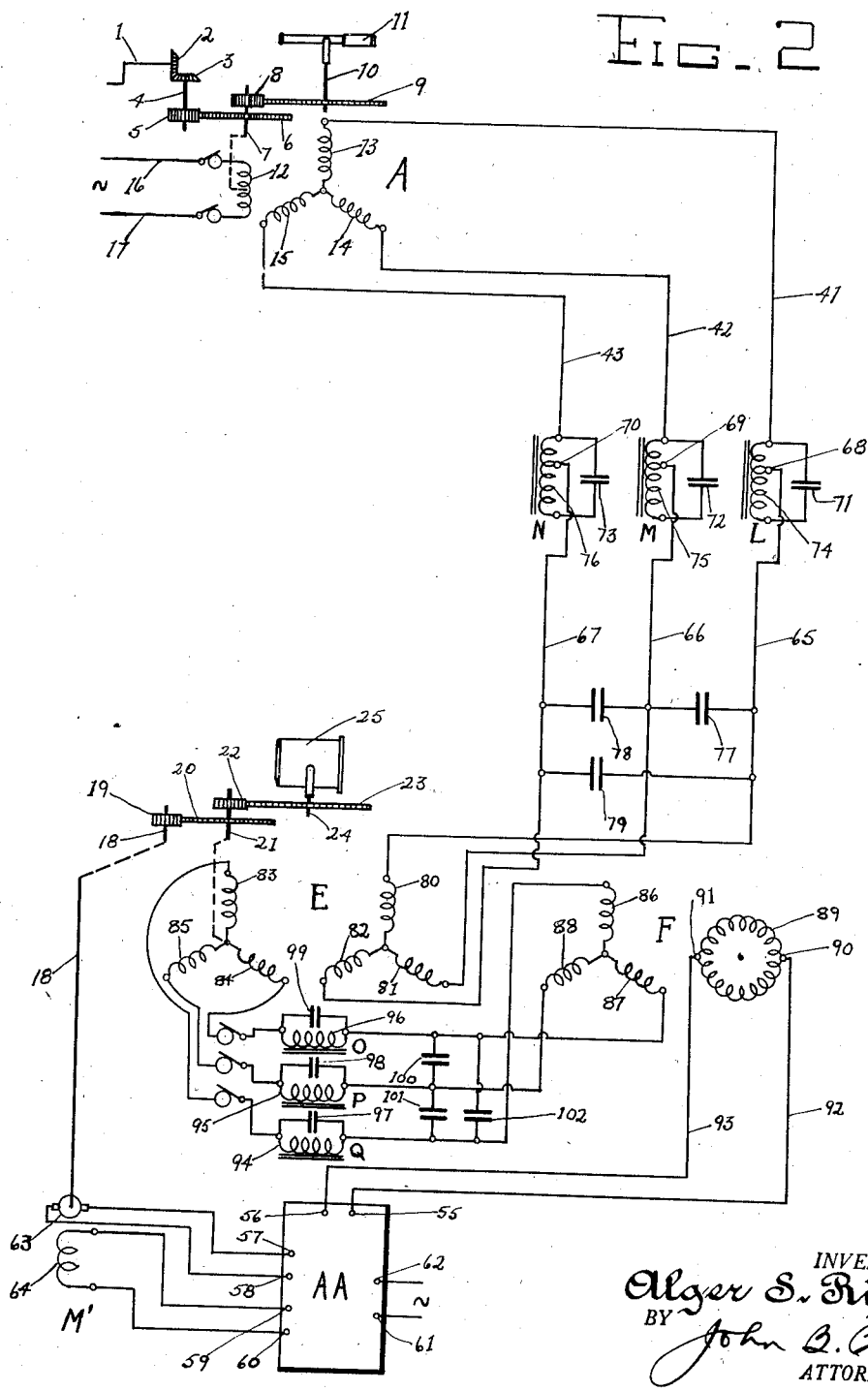
INVENTOR.
Alger S. Riggs,
BY John B. Brady
ATTORNEY.

Patented Oct. 17, 1939

2,176,102

UNITED STATES PATENT OFFICE 2,176,102

LAG COMPENSATOR FOR ELECTRICAL CONTROL SYSTEMS

Alger S. Riggs, Washington, D. C., assignor of one-third to John B. Brady, Washington, D. C.

Application October 20, 1936, Serial No. 106,701

11 Claims. (Cl. 172—239)

My invention relates broadly to angular positional control systems wherein a heavy object such as a searchlight, steering mechanism, gun or other apparatus is controlled in angular position from a distant point in accordance with angular direction from a telescope or other direction determining apparatus.

One of the objects of my invention is the provision of means for producing a high degree of dynamic accuracy whereby the controlled object may be made to run in absolute agreement with the direction determining apparatus under all operating conditions.

Another object of my invention is the provision of means whereby the controlled object may be made to move toward a new angular position in advance of the transmitted directions under conditions of very high accelerations.

Still another object of my invention is the provision of means, capable of permanent adjustment, whereby an increase in signal magnitude may be introduced between the direction controlling apparatus and the controlled object as a function of the velocity of angular movement of the directions to said object without the necessity of moving parts of any kind to the system.

A further object of my invention is the provision of means which, in addition to providing for a reduction of velocity, lag, or disagreement, also provides control components for producing high degrees of stability and freedom from hunting, overshooting, and dynamic hunt commonly called surging.

A still further object of my invention is the provision of control apparatus which may be utilized in conjunction with present angular control systems with resulting increase in their accuracy and stability of operation.

These and further objects of my invention will be understood from the following specification by reference to the accompanying drawings, in which:

Figure 1 is a complete angular positional control system in diagrammatic form, in which a searchlight is controlled from a distant telescope, and in which the lag or disagreement is off-set or compensated by introduction of a control signal proportional to the angular velocity of the direction. The control component due to velocity is produced by an auxiliary receiving device, or follow-up, separate from the main control which has a lag or disagreement proportional to speed and which produces a voltage proportional to its lag. The control system is differentially activated by the signal derived from positional disagreement of the main control receiver and the transmitter, and by the signal derived from the disagreement of the auxiliary receiver, or follow-up; and Fig. 2 is a complete angular positional control system, in diagrammatic form, in which a searchlight is controlled from a distant telescope as in Fig. 1.

However, in Fig. 2 the method of introducing correction for the lag is fundamentally different from that of Fig. 1, inasmuch as the transmitted direction to the searchlight control system is increased in magnitude as a function of transmitter angular velocity; also, in Fig. 2 a similar arrangement to that used for introducing lag compensation is utilized for the production of stabilizing control components which prevent the searchlight from hunting, overshooting and surging, at the coincidence point of angular agreement with the transmitter.

In both Fig. 1 and Fig. 2, similar reference characters refer to like components where identically utilized.

In angular positional control systems (commonly known as follow-up systems) wherein an object is positionally controlled from a remote point through the use of the so-called "Selsyn" data transmitting system, the controlled object is adapted to be driven by a reversible driving means (usually an electric motor) in accordance with positional disagreement between the transmitter and a receiver which is operated synchronously with the controlled object.

Such follow-up systems are generally characterized by the fact that the positional disagreement between the transmitter direction and the controlled object is a function of the angular velocity of the movement of the transmitter direction.

Usually the disagreement during movement is a linear function of the angular velocity. But, even if this is not the case, the differential introduction of a control component dependent upon transmitter angular velocity as an adjunct to the displacement signal component results in a follow-up system having much greater degrees of dynamic accuracy than those now generally utilized for control purposes.

Since my invention relates to means for producing and utilizing a control component functional upon the velocity of the transmitted direction, a still further object is the provision of means for producing higher degrees of dynamic accuracy than have heretofore been obtainable with stability.

Referring now to Fig. 1, the searchlight 25, through the control system, is positioned by the motor M' in angular agreement with the telescope 11.

The telescope is moved angularly by the hand crank 1, gears 2—3, shaft 4, gears 5—6, shaft 7, gears 8—9, and shaft 10. Simultaneously the shaft 7 drives the rotor (primary) 12 of the transmitter A. A source of power is connected to conductors 16—17 for energizing the primary of the transmitter A, the secondary of which (coils 13—14—15) serves to provide means for transmitting angular directions to a receiving device B located at the searchlight. Conductors 41—42—43 serve to connect the terminals of the "phases" 13—14—15 of the transmitter secondary to the terminals of the receiver primary "phases", or coils 44—45—46 respectively. This arrangement results in a flux in the stator of the receiver B along the same axis as the magnetic axis of the rotor 12 of the transmitter. The rotor (secondary) 47 of the receiver B is rotated by the searchlight at the same geared ratio as the transmitter rotor is geared to the telescope.

The receiver rotor 47 is shown in the zero position, that is at 90° from the axis of the flux in the stator of the receiver produced by currents in the primary stator windings 44—45—46.

Relative movement of either rotor (12 or 47) results in the production of a voltage across the terminals of the secondary 47 which is due to relative displacement between telescope and searchlight. This voltage, acting in conjunction with the voltage of the secondary winding 51 of the transformer T is impressed upon the input terminals 55—56 of the motor control amplifier AA whose output terminals 57—58—59—60 connect to the armature 63, and the field 64, of the motor M'. In accordance with signals at the terminals 55—56 the amplifier supplies power (impressed at terminals 61—62) to the motor which drives the searchlight (toward a position of agreement) through shaft 18 (here shown off-set to separate it diagrammatically from the electrical connections) gears 19—20, shaft 21, gears 22—23, and shaft 24. Simultaneously with the movement of the searchlight (as above mentioned) the shaft 21 also drives the rotor 47 of the receiver B.

Thus, eliminating the functioning of the lag compensator producing the voltage across the transformer T, the searchlight is controlled from the telescope by a conventional follow-up control system.

I have not shown the detail of the amplifier AA, since its details form no part of this invention, but it may be of the electron and/or gas tube type, or may be of tubeless construction such as shown in my co-pending application Serial No. 101,529, filed September 18, 1936, or of the type shown in Edwards Patent 1,985,982, granted January 1, 1935.

If now the functioning of the lag compensator be eliminated, the motor M will drive the searchlight into agreement with the telescope, the disagreement or "lag" being sufficient to supply the required actuating voltage at the input terminals 55—56 of the amplifier AA.

Since the voltage required to operate the motor is substantially proportional to the speed, or angular velocity of the telescope movement, a voltage proportional to the velocity introduced at the amplifier input terminals in series with the rotor 47, and of correct relative magnitude, will result in the searchlight following the telescope movement with zero lag. In other words: the displacement signal is unnecessary. Moreover, if the voltage supplied as a function of speed is above that which is required, the searchlight will follow the telescope with a "lead". That is, the searchlight will move in angular position in advance of the movement of the telescope, but under full control of the telescope movement.

The signal functional upon the telescope angular velocity is produced through the coordinated action of the receiving device D, eddy current torque motor, or damper C, and the transformer T.

The operation is as follows:

The receiver D consists of a differential transformer having a stator primary winding comprising the "phases" 26—27—28 and a rotor secondary winding comprising the "phases" 29—30—31. Conductors 36—37—38 serve to connect the terminals of the windings 26—27—28 to like terminals of the transmitter windings 13—14—15 respectively. Thus the stator magnetomotive force of the receiving device D is along the same axis as the magnetic axis of the rotor 12 of the transmitter A.

The terminals of windings 30—31 are connected to the end terminals of the primary 53 of the transformer T while the terminal of winding 29 and the mid point 54 of the primary 53 connects through conductors 39—40 respectively to the power supply which energizes the rotor 12 of the transmitter A. Thus the receiver rotor is "polarized" and tends to align itself in a position of agreement with the transmitter rotor. When the rotors of the receiver D and the transmitter A are not in exact alignment as above a voltage is induced in the windings 30—31, resulting in a voltage at the transformer primary winding 53 due to the disagreement.

The rotor of receiver D therefore tends to move synchronously with the transmitter as in a conventional "Selsyn" repeater motor, and simultaneously provides a voltage due to disagreement across the transformer T. In order that the voltage produced by the receiver D (due to its relative displacement with respect to the transmitter) be proportional to the angular velocity of the telescope, the receiver rotor is dynamically loaded so that its "lag", or disagreement is proportional to its rotational speed.

Dynamic braking of the rotor of the receiver D is accomplished by the eddy current torque motor C, comprising the magnetic structure 34, (which is magnetized by the current through the "field" winding 35) and the rotor 33. The entire device comprising the receiver D and the dynamic braking device C may preferably be of the type disclosed in my co-pending application Serial No. 105,349, filed October 12, 1936, or may consist of separate units mechanically connected by shaft 32 so that both rotors operate together.

The receiver D together with the damping device C and the transformer T comprises a miniature follow-up system deriving its torque from the transmitter, and having a lag or disagreement proportional to transmitter angular velocity.

The terminals of the rotor 47 of the receiver B are connected through conductors 48—49—50 to the secondary 51 of the transformer T and the input terminals 55—56 of the amplifier AA. Adjustable tap 52 provides means for adjusting the magnitude of the voltage supplied by the device D, while adjustment of the current through the "field" winding 35 provides further means of regulating this voltage to correct magnitude.

Suppose now that the telescope is being moved at some finite speed, and the searchlight is being driven at like speed by the motor M'. Now by proper adjustment (as above described) of the voltage at the transformer secondary 51 the receiver rotor 47 may run in absolute agreement with the zero axis of the flux in its stator, and no lag or disagreement is required, since the operating signal is supplied by the auxiliary follow-up system comprising the receiving device D, damper C and transformer T.

In some instances the torque for operation of the device D may be supplied by a separate motor, and the lag compensating signal derived as a function of the speed of this auxiliary motor. In this case the receiver D is similar to that shown (B) in connection with the searchlight control system proper.

If the moment of inertia of the rotors of the devices D and C are correctly chosen, they will not only lag by a predetermined angle from the transmitter under a steady running condition (thus furnishing a signal proportional to transmitter speed which permits of zero lag between telescope and searchlight) but will have a greater relative "lag" during high increments of speed increase of the transmitter and a lesser relative "lag" during high increments of speed decrease of the transmitter. This permits of impressing a signal upon the amplifier to so control the motor that the searchlight may "lead" the telescope during very high accelerations from one position to another, or from one speed to another.

The lag compensator therefore is capable of supplying a signal proportional to data (transmitter and telescope) speed, plus or minus a signal due to rate of change of data speed.

Referring more particularly to Fig. 2 of the drawings, the searchlight 25 is driven by the motor M' into angular agreement with the telescope 11 in response to signals impressed at the input terminals 55—56 of the amplifier AA.

The terminals of the secondary of the transmitter phases 13—14—15 are connected through conductors 41—42—43 to the upper end terminals of the tuned circuits L—M—N, respectively. Conductors 65—66—67 tapped at points 68—69—70 of the inductances 74—75—76 convey current to the "phases" 80—81—82 of the primary (stator) of the receiving device E, whose rotor, comprising the "phases" 83—84—85 is driven by the shaft 21, as is the rotor 47 of Fig. 1.

The terminals of the "phases" 13—14—15 of the transmitter secondary are thus connected to like terminals of the "phases" 80—81—82 of the receiver primary windings through portions of the tuned resonant circuits L—M—N. The static condensers 77—78—79 serve to tune to resonance the primary windings of the receiver so that the only component of current supplied by the transmitter is the power component due to resistance, eddy current and hysteresis losses in the system.

The secondary phases 84—85—83 of the receiver E is connected through resonant circuits O—P—Q to like points of the primary windings 87—88—86 respectively of the device F, whose secondary 89, tapped at points 90—91 supplies signal through conductors 92—93 to the input terminals 55—56 of the amplifier AA.

The primary and secondary of the device F are rotatably arranged similar to a conventional "Selsyn" receiving device, but the rotor 89 is normally "locked" in a fixed position. This device F serves only to provide means for impressing a directive signal upon the amplifier while at all times maintaining uniform load on all "phases" of the transmitter; the input impedance of the amplifier being too high to appreciably affect the currents in the devices E and F.

Where a tubeless amplifier such as disclosed in my co-pending application Serial No. 101,529, filed September 18, 1936 is utilized, the terminals of the phases 84—85—83 of the receiver secondary are connected to like points (through the tuned circuits O—P—Q) of the field windings of the first dynamometer device, and the device F is not utilized since the dynamometer field of my above mentioned application corresponds to phases 87—88—86 of the primary of device F.

Static condensers 100—101—102 serve to tune to resonance the primary winding of the device F so that the only current taken to establish its flux is due to resistance, eddy current and hysteresis losses.

The constants of the resonant circuits L—M—N, comprising the inductances 74—75—76 shunted by the condensers 71—72—73 respectively are so chosen in relation to the resonant circuits comprising the primary windings of the receiver E and condensers 77—78—79 that the "build-up time" of circuits L—M—N is considerably greater than that of the tuned primaries 80—81—82. That is to say in the product of inductance L and capacitance C in the resonant circuits, the constants are such that the capacitances in the circuits L—M—N are proportionately larger than the capacitances 77—78—79, so that in the cycle of operation the portion required to charge the condensers 71—72—73, the "build-up time" thereof, is greater than that required to charge the condensers 77—78—79, the discharge requiring a shorter and a longer portion of the cycle, respectively in each case, due to the corresponding relatively smaller and larger inductive reactances. With respect to the primary of receiver E then, condensers 71—72—73 supply substantially a leading current, proportional to the velocity of displacement in the transmitter, which advances the flux in E produced by the current supplied from the transmitter in proportion to the degree of displacement of the telescope. The net result is that the static "steady state" flux produced by the currents in the primary of the receiver E is less than the flux therein during the rotation of the transmitter, with the result that upon rotation of the transmitter the flux in device E is, in effect, advanced in proportion to transmitter angular velocity.

Likewise the "build-up time" of tuned circuits O—P—Q (comprising the inductances 94—95—96 shunted by the condensers 97—98—99) is considerably greater than that of the tuned primary windings of the device F, which windings are tuned by condensers 100—101—102.

Suppose now that the system is in the zero position as shown, and that the field of the motor M' is deenergized to prevent its rotation.

Displacement from the coincidence point with resulting signal at the input of the amplifier may be obtained by movement of either the telescope or the searchlight, or both.

Suppose the telescope is moved so as to quickly rotate the rotor 12 in a clockwise direction by say 2°. Since the "build-up time" of the resonant circuits L—M—N is higher than that of the primary winding of the receiver E, the flux of the receiver E not only increases in magnitude during the movement of the rotor 12, but actually advances, so that the resulting momentary flux displacement in the stator of the device E may be several times as great as that at the transmitter A.

Likewise the tuned circuits O—P—Q have a like effect on the flux in the primary windings of the device F, so that for a quick displacement of the rotor 12 of the transmitter A, a displacement of appreciably greater angular magnitude plus a greater flux is produced in device F. This results in a signal at the amplifier proportional to the transmitter displacement, relative the "normal" or coincidence position with respect to the receiver rotor, plus a signal due to rate of change of this displacement.

The same condition obtains if the transmitter rotor 12 is left at the coincidence point and the searchlight so moved as to displace the rotor of the device E, but of lesser magnitude since the "rate" component is produced primarily by the resonant circuits O—P—Q and the flux of the receiver primary is not appreciably affected.

If the motor field be now energized it will drive the searchlight toward angular agreement with the telescope, but upon relative movement of the rotor of device E and its stator flux a rate component is produced which results through resonant circuits O—P—Q in the input voltage at the amplifier decreasing at a higher rate than the displacement decrease, so that the amplifier signal not only may reach zero but may actually reverse before the coincidence or agreement point is reached due to the action of the circuits O—P—Q in shifting the flux in the device F. The result is that the searchlight is brought smoothly into alignment with the telescope. The rate components produced through the action of resonant circuits O—P—Q serve to "damp" the follow-up action in such manner as to oppose (through the amplifier and motor) any displacement change between transmitter and receiver rotor coincidence positions.

When the searchlight is following the telescope at a steady speed, or angular velocity, the action of the tuned circuits L—M—N is such as to increase the receiver primary flux in proportion to transmitter speed, thus, in effect, advancing the flux in the receiver E and decreasing the disagreement which would otherwise be required to provide the motor control signal at the amplifier input.

During periods of high accelerations of the telescope the combined action of the tuned circuits L—M—N and O—P—Q may even cause the searchlight to run with an angular advance over the position of the telescope.

Although I have shown and described my invention in relation to searchlight azimuth control from a telescope, and in representative form for the purpose of describing its operation I do not intend to limit it thereto.

My invention is applicable to the control of any heavy object in angular relation to a direction determining device. For instance a gun may be controlled from a fire control director or a steering apparatus may be controlled from the wheel, or from the master compass.

I desire therefore that my invention be limited only to the extent of the appended claims.

What I claim as new and desire to secure by Letters Patent of the United States is as follows:

1. In an electrical control system employing a "Selsyn" type transmitter and a receiver for controlling an object in agreement with said transmitter, the combination with said transmitter and said receiver of an electrical network therebetween including resonant electrical circuits for effecting quantitative changes in the flux of said receiver dependent upon the angular velocity of said transmitter.

2. In a remote angular positional control system, means for determining angular directions and means for transmitting said directions, an object positionally controlled in accordance with said directions, driving means for said object, means for controlling said driving means including a receiver driven by said object and an amplifier activated through said receiver, and means including tuned electrical circuits between said transmitter and said receiver and between said receiver and said amplifier for quantitatively and qualitatively modifying the activation of said amplifier.

3. In a remote angular positional control system, means for determining angular directions and means for transmitting said directions, an object positionally controlled in accordance with said directions, driving means for said object, means for controlling said driving means including a receiver driven by said object and an amplifier activated through said receiver, and means including tuned electrical circuits between said transmitter and said receiver for quantitatively and qualitatively modifying the activation of said amplifier.

4. In a remote angular positional control system, means for determining angular directions and means for transmitting said directions, an object positionally controlled in accordance with said directions, driving means for said object, means for controlling said driving means including a receiver driven by said object and an amplifier activated through said receiver, and means including tuned electrical circuits between said receiver and said amplifier for quantitatively and qualitatively modifying the activation of said amplifier.

5. In an electrical positional control system employing "Selsyn" type directional transmitting and receiving devices as component parts of said system, the combination with said transmitter and said receiver of an electrical network therebetween which comprises substantially tuned electrical circuits in series with each line of the data circuit, and capacitative reactances across each of the data receiving windings of said receiver.

6. An electrical control system employing as component parts thereof, a "Selsyn" type transmitter and receiver, and electrical circuit connections therebetween, said electrical circuit being characterized by means for altering the impedance of said circuit as a function of the rate of angular velocity of movement of said transmitter rotor.

7. An electrical network for effecting directional data transmission comprising a transmitter and a receiver of the "Selsyn" type and including impedance means subject to impedance changes dependent upon the rate of change of said directional data.

8. An electrical network comprising a "Selsyn" receiving device and control apparatus operative through data from said "Selsyn" receiving device, and including impedance means connected between said receiving device and said control apparatus and subject to impedance changes dependent upon the rate of change of said data.

9. Means for qualitatively and quantitatively effecting the transmission of directional data comprising directional determining apparatus including "Selsyn" type devices, an object, means controlling said object in accordance with said direction determining apparatus, and electrical networks between said "Selsyn" devices and between said devices and the controlling means for said object, said networks including impedance means operative to effect impedance changes in said networks dependent upon the rotational angular velocity of one of said "Selsyn" devices, and upon the relative rotation of both of said devices.

10. Means for qualitatively and quantitatively effecting the transmission of directional data comprising directional determining apparatus including "Selsyn" type devices, an object controlled in accordance with said direction determining apparatus, and electrical networks between said "Selsyn" devices, said networks including impedance means operative to effect impedance changes in said networks dependent upon the rotational angular velocity of one of said "Selsyn" devices.

11. Means for qualitatively and quantitatively effecting the transmission of directional data comprising directional determining apparatus including "Selsyn" type devices, an object, means for controlling said object in accordance with said direction determining apparatus, and electrical networks between one of said "Selsyn" devices and the controlling means for said object, said networks including impedance means operative to effect impedance changes in said networks dependent upon the relative rotation of said "Selsyn" devices.

ALGER S. RIGGS.